United States Patent [19]
Tran

[11] Patent Number: 5,143,134
[45] Date of Patent: Sep. 1, 1992

[54] TIRE INSTALLATION TOOL

[76] Inventor: Loi V. Tran, 1028 Jackson St., Easton, Pa. 18042

[21] Appl. No.: 734,917

[22] Filed: Jul. 24, 1991

[51] Int. Cl.$^5$ .............................................. B60C 25/04
[52] U.S. Cl. ................................... 157/1.3; 254/131
[58] Field of Search ................ 157/1.17, 1.3; 254/131, 254/131.5, 132

[56] References Cited

U.S. PATENT DOCUMENTS

| | | | |
|---|---|---|---|
| 1,271,919 | 7/1918 | Mathias | 157/1.3 |
| 3,873,067 | 3/1975 | Carpio et al. | 254/131 |
| 4,436,134 | 3/1984 | Gaither | 157/1.3 |
| 4,527,607 | 7/1985 | Gaither | 156/1.3 |
| 4,919,184 | 4/1990 | Du Quesne | 157/1.3 |

Primary Examiner—James G. Smith
Attorney, Agent, or Firm—Eckert Seamans Cherin & Mellott

[57] ABSTRACT

A tool for installing a tire on a wheel rim includes an elongated body member with a handle at one end and a tool head at the other end. The tool head has a tire engaging member terminating in an insertion end and a contact end. The tire engaging member has a back face attached to a connector portion of the elongated body member, and a front face on an opposite side of the tire engaging member. A tire contact part extends above the front face at the contact end. A wheel rim contact member extends from the back face and terminates in a wheel rim contact part. A portion of the tire engaging member between the insertion end and the wheel rim contact member is insertable between a tire bead and a rim flange.

22 Claims, 4 Drawing Sheets

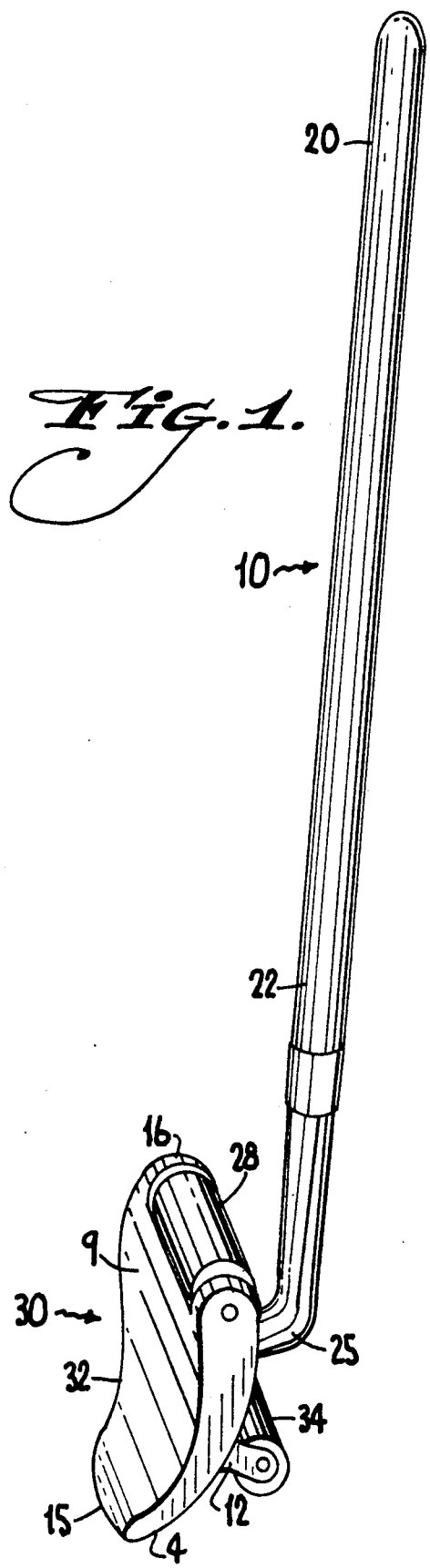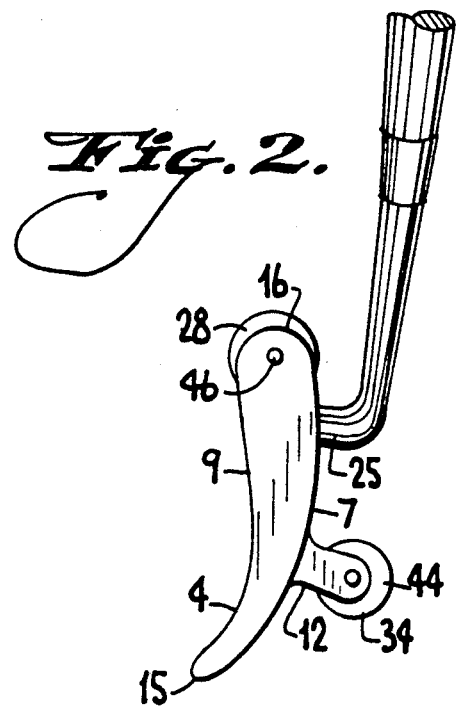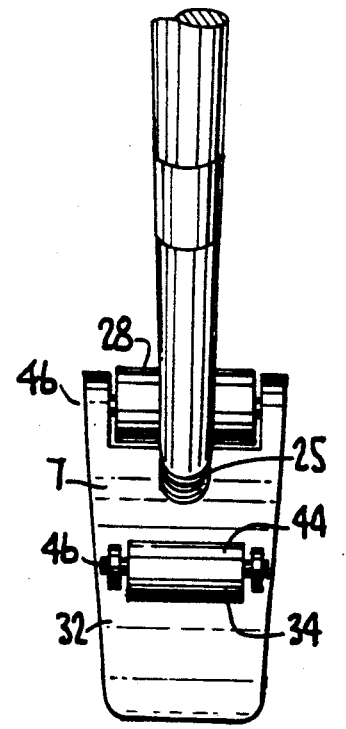

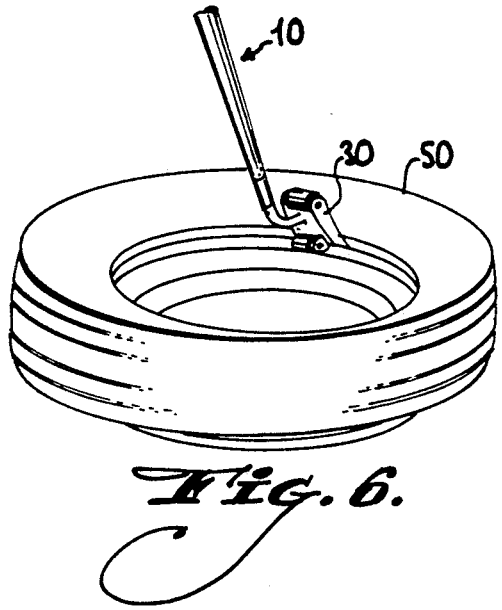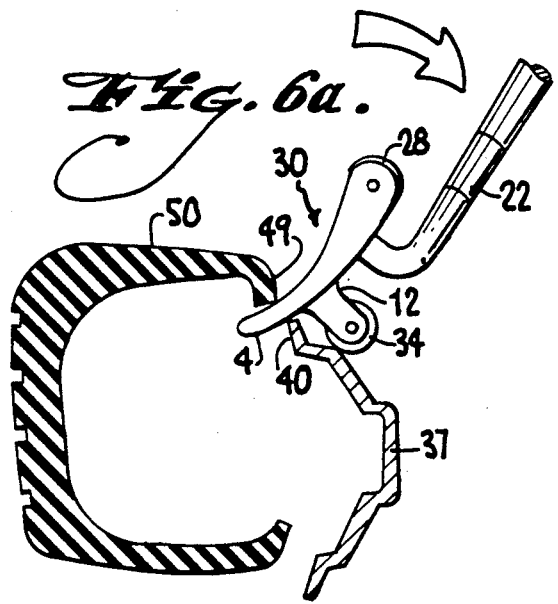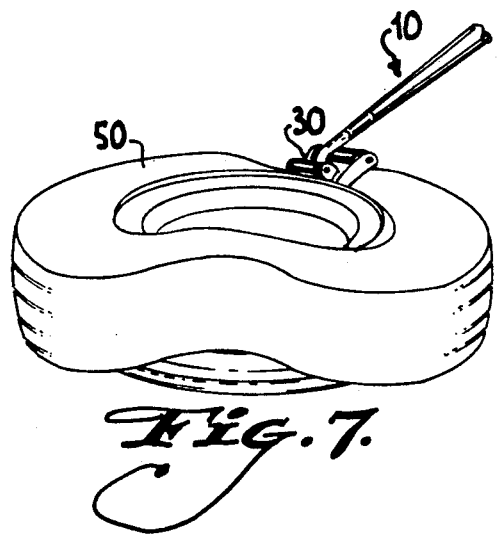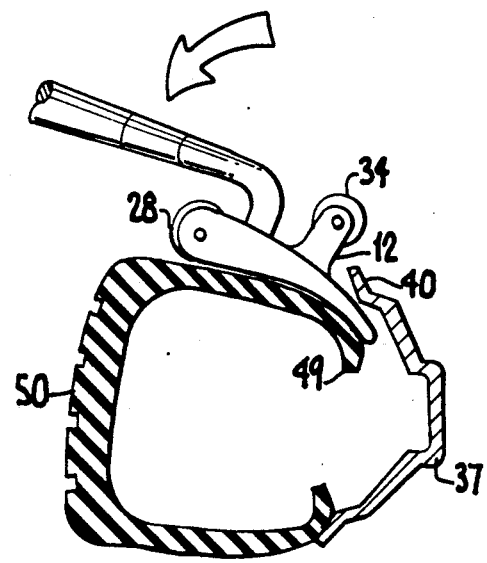

TIRE INSTALLATION TOOL

BACKGROUND OF THE INVENTION

1. Field of the Invention

The invention relates to the field of tools for installing a vehicle tire on a wheel rim, and in particular to a manual pry tool for pushing both beads of a truck tire over one side of the rim.

2. Prior Art

Manual pry tools for installing a tire on a wheel rim are known. Such tools are operable to install a tire on a wheel rim having a lower rim flange disposed horizontally on a ground surface. Such tools generally comprise an elongated pry bar which has a handle end to be gripped by a user, and a flattened tool end for insertion between one bead of the tire, which is disposed horizontally above the wheel rim, and an upper wheel rim flange. The beads of the tire normally reside between the upper and lower flanges and the beads must be moved axially inward downwardly over the upper rim flange to install the tire on the rim. After the tool end is inserted between the tire and the wheel rim, the user applies pressure to the handle end, using the tool as a lever with the upper rim flange as a fulcrum, in order to pry a short length of the tire bead (which is of slightly smaller circumference than the wheel rim but can be resiliently stretched) over the upper flange of the wheel rim. The process is repeated in successive stages around the periphery of the wheel rim until a substantial circumference of the tire bead is passed over the rim, where upon the resilience of the bead assists in drawing the remainder of the bead to the inside of the rim between the rim flanges. Alternatively, after a length of the tire bead has been pried over the rim flange, a machine may be utilized for sliding the tool end circumferentially around the periphery of the wheel rim flange whereby the tire bead is pulled over the rim flange in a continuous motion. In either case, installing a tire on a wheel rim with the known installation devices is a difficult task. Further, many modern wheels are made from aluminum or have a polished metal surface to provide an attractive appearance. Such wheels are susceptible to damage when a tire is installed using the known installation tools. Further, the user often resorts to using a hammer to beat a portion of the tire bead over the wheel rim flange, and the wheel rim may be accidentally struck, causing nicks, cracks, bent rims, etc. There is a need for a tire installation tool which permits the installation of both the lower and the upper tire beads on the wheel rim in a simple operation, in a manner that allows single lever motions to pull the first and second beads over the rim flange in sequence, without requiring excessive force which may tempt a user to strike the tire bead with a hammer.

SUMMARY OF THE INVENTION

It is an object of the invention to provide a tire installation tool which is durable, simple and easy to use for various tire sizes.

It is another object of the invention to provide a tire installation tool which allows a lower tire bead to be installed on a wheel rim in one lever-like operation.

It is a further object of the invention to provide a tire installation tool which also allows the upper bead to be installed on a wheel rim, in a similar lever-like operation while the wheel rim is resting on the ground.

It is yet another object of the invention to provide a tire installation tool which allows a tire to be installed without damage to the tire or wheel rim.

These and other objects are accomplished by a tool comprising an elongated body member defining a handle and a tool end, the tool end having a connector portion, and a tool head at the tool end of the elongated body member. The tool head has a tire engaging member terminating in an insertion end and a contact end, the tire engaging member having a back face attached at an end of the connector portion and a front face on an opposite side of the tire engaging member. The tool head further has a tire contact part extending above the front face at the contact end of the tire engaging member, and a wheel rim contact member extending from the back face and terminating in a wheel rim contact part. A portion of the tire engaging member between the insertion end and the wheel rim contact member is insertable between one of the tire beads and the upper wheel rim flange.

BRIEF DESCRIPTION OF THE DRAWINGS

There are shown in the drawings the embodiments of the invention that are presently preferred. It should be understood, however, that the invention is not limited to the precise arrangements and instrumentalities shown in the drawings, wherein:

FIG. 1 is a perspective view of a tire installation tool according to the invention.

FIG. 2 is a side view of the tire installation tool according to the invention.

FIG. 3 is a rear view of the tire installation tool according to the invention.

FIG. 6 is a perspective view of the tire installation tool inserted between an upper tire bead and a wheel rim flange.

FIG. 6a is a cross-sectional view of the tire and tire installation tool shown in FIG. 6.

FIG. 7 is a perspective view of the tire installation tool rotated for installing a portion of the upper tire bead on the wheel rim.

FIG. 7a is a cross-sectional view of the tire and tire installation tool shown in FIG. 7.

DETAILED DESCRIPTION OF THE PREFERRED EMBODIMENTS

Figure 4:
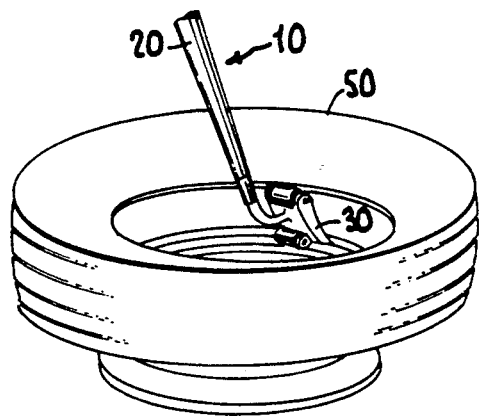
FIG. 4 is a top perspective view of the tire installation tool shown inserted between a lower tire bead and a wheel rim flange.

A tire installation tool according to the invention as shown in FIGS. 1-3 comprises an elongated body member 10 with a handle end 20 and a tool end 22. The tool end has a connector portion 25 extending therefrom, and a tool head 30 is attached to, or is integral with, the tool end 22. The handle end 20 is preferably defined by a shaft extending to the extreme end of the tire installation tool, although a suitable hand grip part, for example a tubular grip or closed end U-shaped member or the like, may be attached to the handle end. The elongated body member 10 is sufficiently long so that a user of the tire installation tool can develop adequate leverage to pass the tire beads over the rim of a tire by using the elongated body member as a lever arm as hereinafter described, without having to apply excessive force at the handle end. The elongated body member 20 and the tool head 30 are preferably made from a corrosion resistant steel for adequate strength and durability.

The conventional pneumatic tire for motor vehicles and the like has a pair of axially spaced beads along the radial inner edge of the tire. When the tire is mounted on a wheel rim with both of the beads between the wheel rim flanges, the beads engage with axial pressure, due to tire inflation, against the radially outermost lip of the wheel rim flanges on opposite sides of the wheel. The bead and the rim flange in each case are continuous circles, and the bead is slightly smaller in diameter than the rim flange. The bead normally has an embedded wire reinforcement, but is sufficiently resilient that with sufficient force the bead can be stretched in circumference to be forced over the rim flange during either tire installation or removal.

The tool head 30 of the tire installation tool according to the invention includes a tire engaging member 32 terminating in an insertion end 15 and a contact end 16. The tire engaging member 32 has a back face 7 attached at an end of the connector portion 25, and a front face 9 on an opposite side of the tire engaging member. The connector portion 25 may be angled relative to the back face 7. In a preferred embodiment, the connector portion 25 is an L-shaped extension of the elongated body member 10, and the tire engaging member 32 is disposed substantially parallel to the elongated body member at an end of the L-shaped extension.

A tire contact part 28 extends above the front face 9 at the contact end 16. A wheel rim contact member 12 extends from the back face 7 and terminates in a wheel rim contact part 34. The wheel rim contact member 12 and the tire engaging member 32 preferably define a substantially right angled bend. The right angle is located at a distance from the insertion end 15 of the tire engaging member 32, the distance defining a lower portion 4 of the tire engaging member which is insertable between the tire bead and the rim flange as will be more fully described hereinafter.

Preferably each of the tire contact part 28 and the wheel rim contact part 34 comprises at least one rotatable roller 44 at a respective distal end thereof, for decreasing sliding friction at the contact parts and minimizing potential damage to the rim and/or tire. It is preferred that the at least one rotatable roller be a single cylindrically shaped member having an axle 46 such as a pin or the like which is retained in the tire engaging member and wheel rim contact member by an interference fit. The at least one rotatable roller may also have a spherical shape, and may include more than one roller, such as two or more spherical members, etc.

Figure 4A:
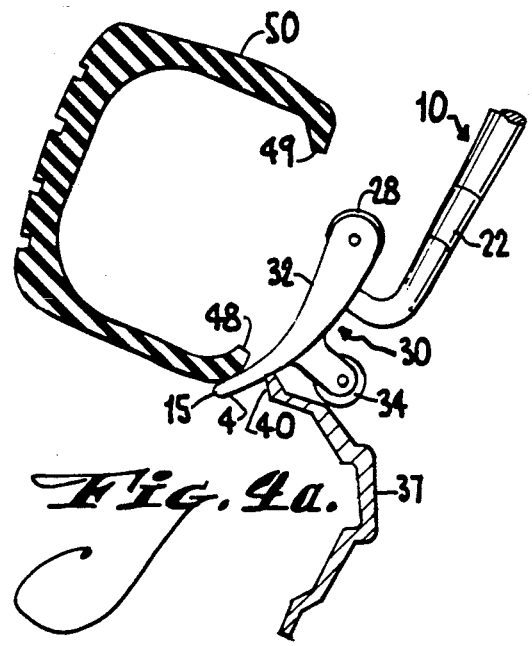
FIG. 4a is a cross-sectional view of the tire and installation tool shown in FIG. 4.
Figure 5:
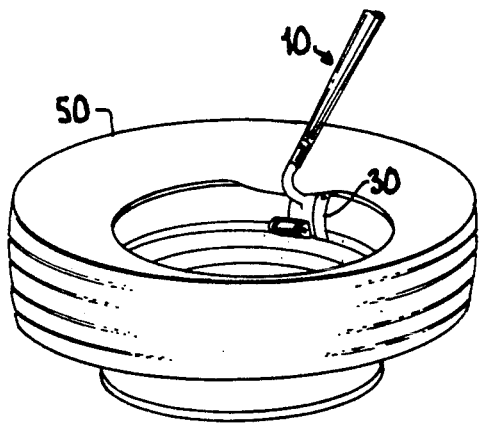
FIG. 5 is a top perspective view of the tire installation tool partially rotated for installing the lower tire bead on the wheel rim.
Figure 5A:
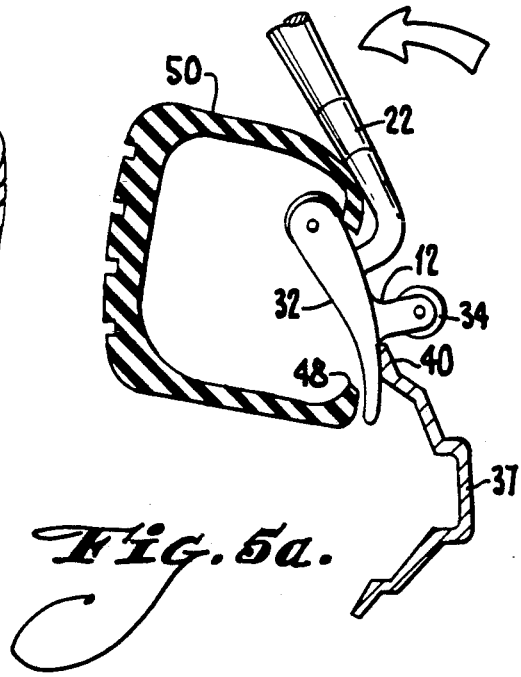
FIG. 5a is a cross-sectional view of the tire and tire installation tool shown in FIG. 5.
Figure 8:
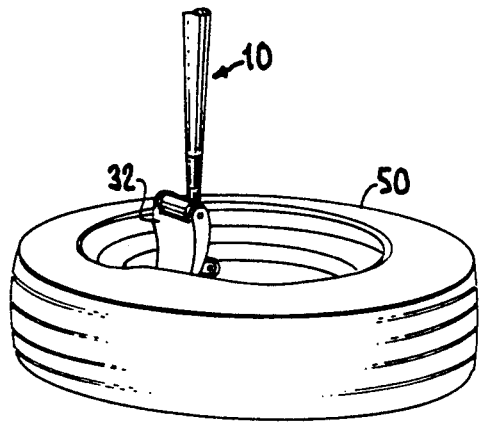
FIG. 8 is a perspective view of the tire installation tool inserted between a remaining uninstalled portion of the upper tire bead and the wheel rim flange.
Figure 8A:
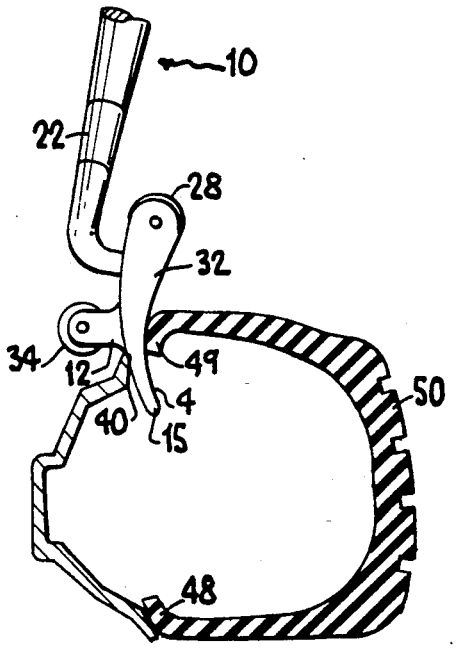
FIG. 8a is a cross-sectional view of the tire and tire installation tool shown in FIG. 8.
Figure 9:
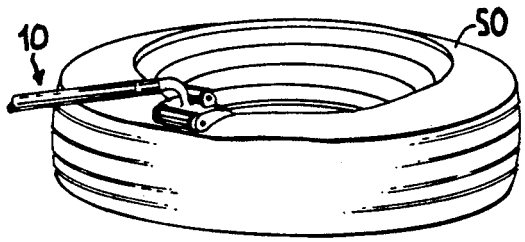
FIG. 9 is a perspective view of the tire installation tool rotated for installing the remaining portion of the upper tire bead on the wheel rim.
Figure 9A:
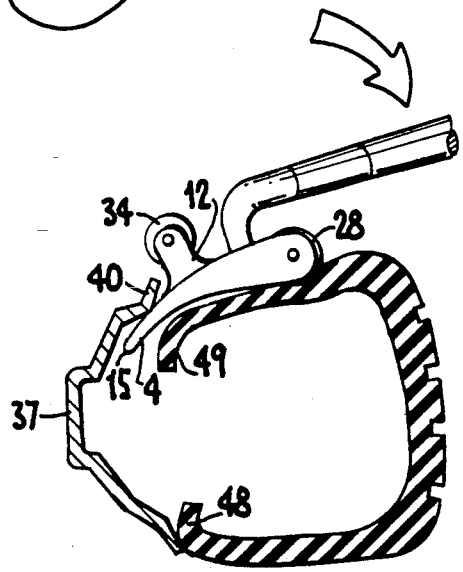
FIG. 9a is a cross-sectional view of the tire and tire installation tool shown in FIG. 9.

Successive steps for use of the tire installation tool according to the invention to completely install a tire on a rim are shown in FIGS. 4-9. The tire installation tool, and more particularly tool head 30 thereof, is applied to the tire 50 and the rim 37 as shown in FIGS. 4 and 4a. The rim is preferably disposed horizontally on a floor. The tire is placed horizontally on top of the rim such that a portion of the lower tire bead is lowered over the upper wheel rim flange 40. The lower portion 4 of the tire engaging member is inserted between the lower tire bead 48 and the wheel rim flange 40 at approximately a central portion of the lower tire bead which is above the rim flange. After the insertion, the wheel rim contact member 12 or the wheel rim contact part 34 abuts the wheel rim. The user then applies a force to the handle end 20 of the tire installation tool to rotate the handle end radially outwardly over the rim flange 40. This resiliently stretches and urges the lower tire bead 48 over the wheel rim flange 40, as shown in FIGS. 5 and 5a, and the tire falls down, until upper tire bead 49 rests on the wheel rim. The lower tire bead 48 is easier to install on the wheel rim 37 than the upper tire bead 49 because, when installing the lower tire bead, the upper portion of the tire including the upper tire bead is unrestrained by the wheel rim and, as such, does not resist stretching of the lower tire bead.

After installation of the lower tire bead, the user preferably rotates the handle end 20 radially inwardly across a diameter of the tire without removing the tool end 22 from the wheel rim. The lower portion 4 of the tire engaging member 32 is thus properly disposed between the upper tire bead 49 and the wheel rim flange 40 for installing the upper tire bead on the wheel rim, as shown in FIGS. 6 and 6a. However, should the user remove the tool end 22 from the wheel rim after installation of the lower tire bead 48, the user may insert the lower portion 4 of the tire engaging member 32 between the upper tire bead 49 and the wheel rim flange 40 at any location around the circumference of the wheel rim. The user then applies a radially outward force to the handle end 20 of the tire installation tool to bring a substantial portion of the upper tire bead 49 over the wheel rim flange 40. The user removes the installation tool and reinserts the tool between the upper tire bead and the wheel rim flange at a central part of the upper tire bead remaining to be installed on the wheel rim. The user again applies a radially outward force to the handle end 20 of the tire installation tool. During this maneuver, the user rotates the tire removal tool such that the elongated body member is brought past a vertical position toward a horizontal position, thereby bringing tire contact part 28 against a wall of the tire near the upper tire bead. Further rotation of the tire installation tool causes the tire contact part to urge the tire bead over the wheel rim flange. Accordingly, in one quick lever-like motion involving inserting the tool head and rotating the tool handle across the tire, the remaining uninstalled portion of the upper tire bead is urged over the rim flange.

The distance from the insertion end 15 to the wheel rim contact member 12 is important for determining the portion 4 of the tire engaging member 32 which is insertable between the tire bead and the rim flange. The portion 4 must be long enough to guide the tire bead completely over the rim flange, yet not be so long as to prevent release of the tire bead once it has passed over the rim flange. A length for this portion of approximately 1 ¼ inches has been found to provide satisfactory results during testing of the tire installation tool.

I claim:

1. A tool for installing a tire on a wheel rim, the tire having axially spaced beads at a radially inward edge, the rim having axially spaced flanges at a radially outward edge, the tool comprising:

an elongated body member defining a handle end and a tool end, the tool end having a connector portion;

a tool head at the tool end of the elongated body member, the tool head having:

a tire engaging member terminating in an insertion end and a contact end, the tire engaging member having a back face attached at an end of the connector portion, and a front face on an opposite side of the tire engaging member;

a tire contact part extending above the front face at the contact end; and, a wheel rim contact member extending from the back face and terminating in a wheel rim contact part, wherein a portion of the tire engaging member between the insertion end and the wheel rim contact member is insertable between one of the tire beads and an adjacent one of the rim flanges.

2. The tool according to claim 1, wherein the connector portion is angled relative to the back face.

3. The tool according to claim 1, wherein the connector portion is L-shaped.

4. The tool according to claim 1, wherein the wheel rim contact member is disposed on the back face between the insertion end and the connector portion.

5. The tool according to claim 1, wherein the tire engaging member is substantially parallel to the elongated body member.

6. The tool according to claim 1, wherein the wheel rim contact part comprises at lease one rotatable roller.

7. The tool according to claim 1, wherein the tire contact part comprises at least one rotatable roller.

8. The tool according to claim 1, wherein the wheel rim contact member is substantially perpendicular to the back face.

9. The tool according to claim 1, wherein each of the wheel rim contact part and the tire contact part comprises at least one rotatable roller.

10. A tool for installing a tire on a wheel rim, the tire having axially spaced beads at a radially inward edge, the rim having axially spaced flanges at a radially outward edge, the tool comprising:

an elongated body member defining a handle end and a tool end, the tool end having a connector portion;

a tool head at the tool end of the elongated body member, the tool end having:

a tire engaging member terminating in an insertion end and a contact end, the tire engaging member having a back face attached at an end of the connector portion, and a front face on an opposite side of the tire engaging member;

a tire contact part extending above the front face at the contact end, wherein the tire contact part comprises at least one rotatable roller; and, a wheel rim contact member extending from the back face and terminating in a wheel rim contact part, wherein the wheel rim contact part comprises at least one rotatable roller, and wherein a portion of the tire engaging member between the insertion end and the wheel rim contact member is insertable between one of the tire beads and an adjacent one of the rim flanges.

11. The tool according to claim 10, wherein the connector portion is angled relative to the back face.

12. The tool according to claim 10, wherein the connector portion is L-shaped.

13. The tool according to claim 10, wherein the wheel rim contact member is disposed on the back face between the insertion end and the connector portion.

14. The tool according to claim 10, wherein the tire engaging member is substantially parallel to the elongated body member.

15. The tool according to claim 10, wherein each of the at least one rotatable rollers are cylindrical.

16. The tool according to claim 10, wherein each of the at least one rotatable rollers are spherical.

17. A tool for installing a tire on a wheel rim, the tire having axially spaced beads at a radially inward edge, the rim having axially spaced flanges at a radially outward edge, the tool comprising:

a tool head having a tire engaging member terminating in an insertion end and a contact end, the tire engaging member having a front face and a back face;

a tire contact part extending above the front face at the contact end;

a wheel rim contact member extending from the back face and terminating in a wheel rim contact part, wherein a portion of the tire engaging member between the insertion end and the wheel rim contact member is insertable between one of the tire beads and an adjacent one of the rim flanges; and, means for exerting a force on the tool head when the portion of the tire engaging member is inserted and the wheel rim contact member is disposed on the outside of the rim, for rotating the tool head around the wheel rim contact member.

18. The tool according to claim 17, wherein the means for exerting a force is an elongated handle.

19. The tool according to claim 17, wherein the wheel rim contact part comprises at least one rotatable roller.

20. The tool according to claim 17, wherein the tire contact part comprises at least one rotatable roller.

21. The tool according to claim 17, wherein the wheel rim contact part is substantially perpendicular to the back face.

22. The tool according to claim 17, wherein each of the wheel rim contact part and the tire contact part comprises at least one rotatable roller.

* * * * *